United States Patent [19]

Nagaoka et al.

[11] Patent Number: 5,227,926
[45] Date of Patent: Jul. 13, 1993

[54] DUPLICATOR SYSTEM MANAGEABLE OF LIFE OF MOTHER TAPE

[75] Inventors: Kazuo Nagaoka; Hirofumi Yoshida; Yoshiki Takao; Susumu Hoshimi, all of Tokyo, Japan

[73] Assignee: Sony Magnescale Inc., Japan

[21] Appl. No.: 619,990

[22] Filed: Nov. 30, 1990

[30] Foreign Application Priority Data

Dec. 1, 1989 [JP] Japan .................. 1-312865

[51] Int. Cl.[5] .................................. G11B 5/86
[52] U.S. Cl. .............................. 360/15; 360/137
[58] Field of Search ............. 360/15, 16, 73.13, 74.4, 360/72.2, 72.3, 132, 49, 17, 31, 27; 369/84, 85, 137; 235/382, 382.5

[56] References Cited

U.S. PATENT DOCUMENTS 4,626,931 12/1986 Hori et al. ...................... 360/16
5,050,031 9/1991 Weiley ......................... 360/137
5,144,504 9/1992 Kitazawa ..................... 360/78.04

Primary Examiner—Aristotelis Psitos
Assistant Examiner—Jennifer Pearson
Attorney, Agent, or Firm—Ronald P. Kananen

[57] ABSTRACT

A duplicator system is provided which transfers information signals such as video signals recorded on a mother tape to a copy tape. This duplicator includes a counting system to manage the life of a mother tape. The counting system is operable to count the number of traveling cycles of the mother tape traveling through a preselected tape path and records data indicative thereof on a preselected section of the mother tape. Thus, an operator can easily read out the data indicative of the total number of traveling cycles from the mother tape to confirm the remainder of the working life thereof.

18 Claims, 15 Drawing Sheets

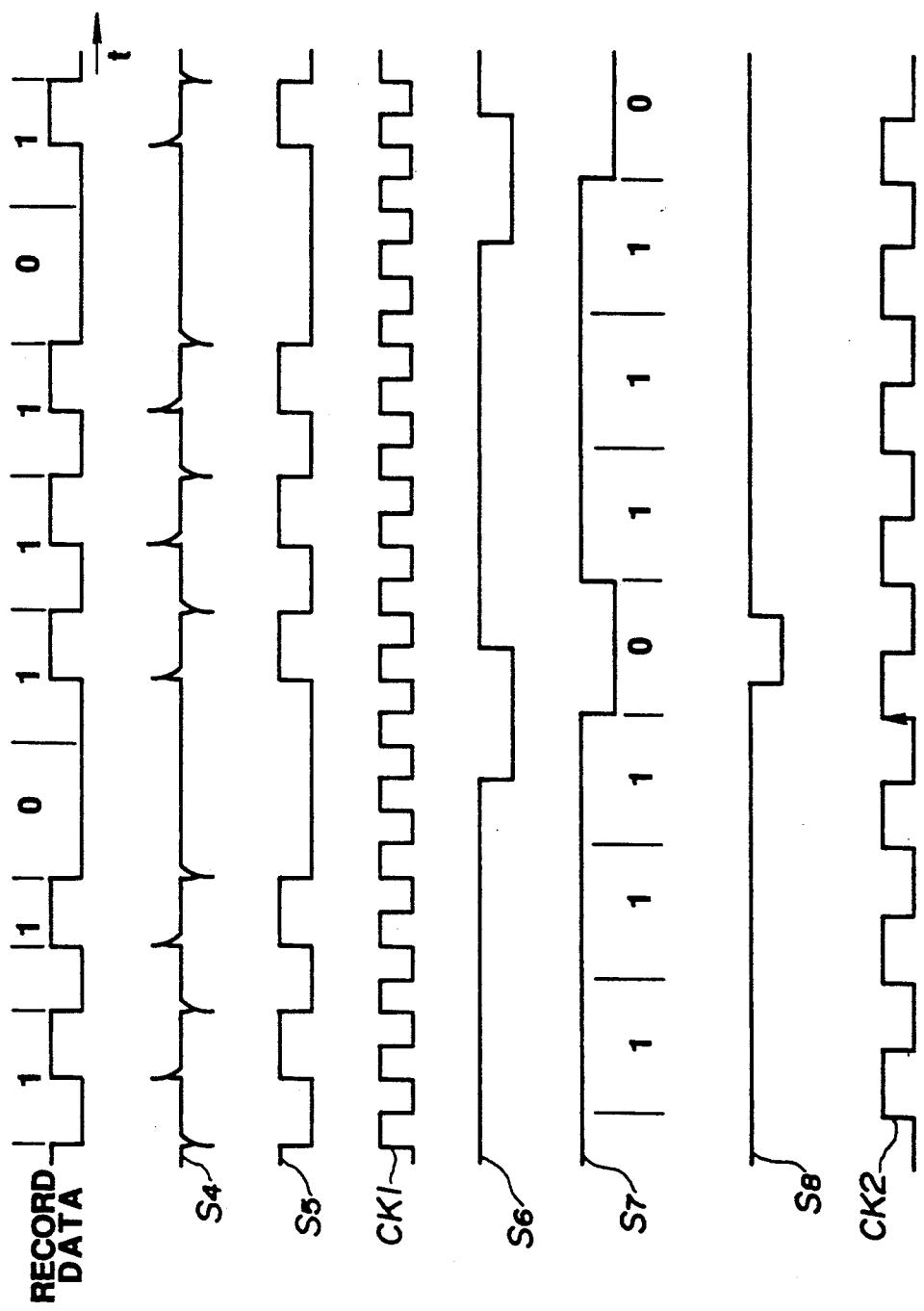

DUPLICATOR SYSTEM MANAGEABLE OF LIFE OF MOTHER TAPE

BACKGROUND OF THE INVENTION

1. Technical Field

The present invention relates generally to a duplicator system which transfers information signals recorded on a mother tape to a copy tape. More particularly, the invention relates to a duplicator system which is manageable of the number of uses, or life, or a mother tape.

2. Background Art

A high speed duplicator system for video tapes is well known in the art in which a mother tape, on which reversed magnetic patterns of information signals representative of a movie, for example, are repeatedly recorded on blank, or copy, tape via a duplicator head to produce many reproductions of the material on the mother tape.

In such a duplicator system, the life of a mother tape is about 5000 traveling cycles (i.e., the number of duplicating cycles) due to wear of a tape material or degradation in magnetic patterns and thus a one-reel mother tape provides five thousand duplicated video tapes.

Of course, if less than five thousand video tapes are copied from a one-reel mother tape in sequential operation, this mother tape can be again used in a subsequent duplicating operation, but only until the maximum of about five thousand cycles in total, has been reached.

Therefore, it is necessary to establish the number of cycles remaining in the life of the mother tape precisely before starting a transferring operation. In a prior art duplicator system, the number of traveling cycles of a mother tape during sequential operation is counted by a counter provided in the system to be indicated to an operator for managing the life of the mother tape.

Such a system for managing the life of individual mother tapes by means of a counter requires a high degree of attention from the operator to correctly observe and record the lifecycles of various mother tapes in order to prevent a mother tape from being used beyond its appropriate lifespan with the result that the mother tape breaks or dropout occurs in copied tapes. The potential for operator error in such a system is undesirably high.

For improving quality control of duplicated tapes, Japanese patent First Publication No. 1-502703 which is a convention application based on British Patent Application No. GB 8701983 filed on Jan. 29, 1987 discloses a system which is adapted for recording identification codes of a mother tape and a used duplicator system and a code indicating production date and time of on a copied tape. It will be appreciated that this prior art system has the disadvantage that it does not record the number of reproduction cycles executed by a mother tape.

SUMMARY OF THE INVENTION

It is accordingly one object of the present invention to avoid the disadvantages of the prior art.

It is another object of the invention to provide a duplicator system which is operable to accurately monitor the number of reproduction cycles executed by a mother tape.

According to one aspect of the present invention, there is provided a duplicator system which comprises: first means for transporting a first recording medium on which an information signal is recorded through a first traveling path; second means for transporting a second recording medium through a second traveling path; third means for transferring the information signal recorded on the first recording medium traveling through the first traveling path to the second recording medium traveling through the second traveling path; fourth means for counting the number of traveling cycles of the first recording medium through the first traveling path to provide a signal indicative thereof; and fifth means for recording data indicative of the number of traveling cycles of the first recording medium counted by the fourth means on a preselected section of the first recording medium based on the signal from the fourth means.

According to another aspect of the present invention there is provided a counting system comprising: first means for transporting a strip recording medium on which an information signal is recorded toward signal processing means through a preselected traveling path; second means for counting the number of traveling cycles of the strip recording medium through the traveling path to provide a signal indicative thereof; and third means for recording data indicative of the number of traveling cycles of the strip recording medium counted by the second means on a preselected section of the strip recording medium based on the signal from the second means.

Further, according to the system of the present invention, a counting or duplication system may include a first circuit for generating and transmitting the data of the number of traveling cycles of the first recording medium which has a predetermined number of bits, a second circuit responsive to the data derived from the first circuit for converting the data into new data in which consecutive occurrences of at least one of a high or a low level data component is limited to a predetermined value, a third circuit for Bi-phase mark modulation modulating the new data derived by the second circuit, and a fourth circuit for recording the Bi-phase mark modulated data onto the first recording medium. Preferably, the second circuit may convert the data derived from the first circuit into new data in such a way that data derived from the first circuit is converted into new data having 16 bits in which a low level or "0" data component does not occur consecutively more than twice.

BRIEF DESCRIPTION OF THE DRAWINGS

The present invention will be understood from the detailed description given hereinbelow and from the accompanying drawings of the preferred embodiments which are given for explanation and understanding only and are not intended to imply limitation to the invention.

FIGS. 19(A) to 19(H) are timing charts of respective signals of a reproducing system as shown in FIG. 18.

DESCRIPTION OF THE PREFERRED EMBODIMENT

Figure 1:
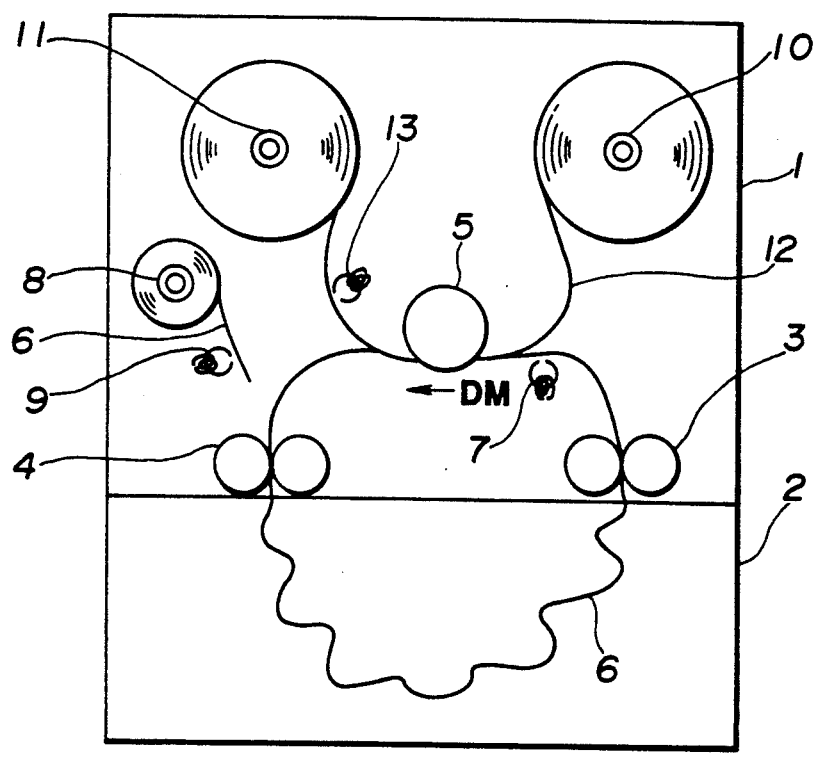
FIG. 1 is a front view which shows a duplicator system to which a system manageable of the life of a mother tape according to the present invention is applied.

Referring now to the drawings, wherein like numbers refer to like parts in several views, initially to FIG. 1, a loop-bin type duplicator is shown to which a signal processing system according to the present invention is applied. This duplicator is operable to transfer magnetic signals recorded on an endless mother tape to a blank or copy tape continuously. The duplicator includes generally a panel 1, a loop-bin 2 (for tape storage), a mother tape supply capstan 3, a mother tape take-up capstan 4 installed on the panel, and a magnetic type transfer drum 5. This drum may be thermal type. The endless mother tape 6 defines a loop which passes through the loop-bin 2, the capstan 3, the transfer drum 5, and the capstan 4. A cue head 7 is mounted between the supply capstan 3 and the transfer drum 5.

The duplicator further includes a tap set reel 8, a recording/reproducing head 9 for the mother tape, a supply reel 10, a take-up reel 11 for a copy tape 12, and a recording head 13 for the copy tape disposed between the transfer drum 5 and the take-up reel 11. The tape set reel 8 serves to supply the mother tape 6 to the loop-bin 2 through the take-up capstan 4 at initial transferring operation, while it winds the mother tape therearound at final transferring operation after a splice area (i.e., a connecting area) of the mother tape is cut. The recording/reproducing head 9 is installed between the tape set reel 8 and the capstan 4. The supply reel 10 and take-up reel 11 are mounted on the panel 1 for feeding the copy tape 12 to the transfer drum 5 continuously.

U.S. Pat. No. 4,868,688, filed on Oct. 28, 1987, entitled ELONGATED STRIP STORAGE APPARATUS AND RECORDER TAPE DUPLICATOR SYSTEM UTILIZING ENDLESS TAPE STORED IN STORAGE APPARATUS assigned to Sony Magnescale Inc., discloses in detail a structure of a duplicator system applicable to the present invention, which disclosure is incorporated herein by reference.

Figure 2:
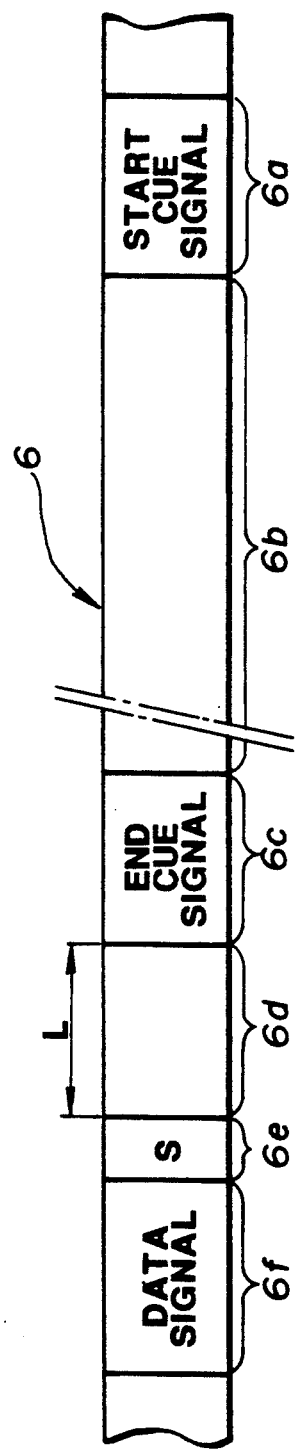
FIG. 2 is a view which shows a tape format of a mother tape used in a duplicator system.

Referring to FIG. 2, a signal format of the mother tape 6 is shown. This mother tape generally provided with a start cue signal recording section 6a, a video signal recording section 6b on which a movie, for example, is recorded, and an end cue signal recording section 6c. At an area away from the video signal recording section 6b by a preselected distance L through a blank section 6d, the mother tape further includes a recording section 6e of a starting bit signal S and a data recording section 6f on which data of the number of traveling cycles of the mother tape is recorded. On traveling cycle is equal to a complete loop of the mother tape in a duplicating cycle.

Figure 3:
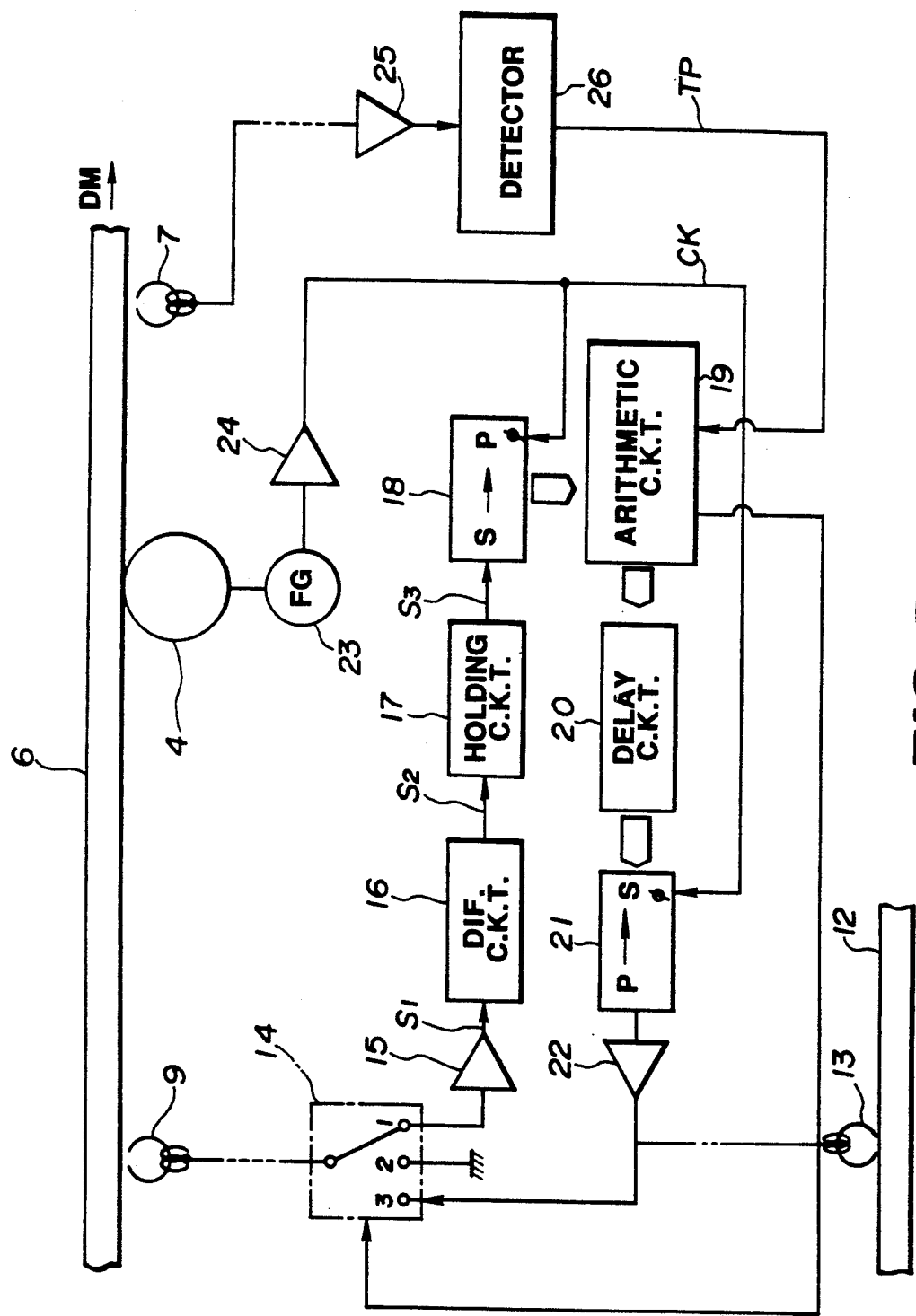
FIG. 3 is a block diagram which shows a signal processing system of the invention applicable to a duplicator system.

Referring to FIG. 3, the signal processing system of the invention is shown which is adapted for recording the total number of traveling cycles on the mother tape itself every duplicating operation. The system includes generally a recording/reproducing head 9, a switching circuit 14, an amplifier 15, a differential circuit 16, a holding circuit 17, a serial/parallel converter 18, and an arithmetic circuit 19. The switching circuit 14 has a movable contact and three fixed contacts to selectively connect a terminal of the recording and/or reproducing head 9 and circuit lines corresponding to the three fixed contacts respectively under control of the arithmetic circuit 18. Initially, the switching circuit 14, as can be seen in the drawing, electrically connects the recording and/or reproducing head 9 and a first fixed contact to provide signals read out from the mother tape 6 to the arithmetic circuit 19. Subsequently, the switching circuit 14 switches to a second fixed contact which is connected to the ground. The arithmetic circuit 19 is operable to add "1" (one) to the data read out form the data recording section 6f of the mother tape through the transfer drum 5·every traveling cycle to update the record of number of traveling cycles of the mother tape 6 successively. The arithmetic circuit 19 outputs updated data to a third fixed contact of the switching circuit 14 through a delay circuit 20, a parallel/serial converter 21, and an amplifier 22 to record it on the data recording section 6f of the mother tape 6 after sequential duplicating operation.

The signal processing system further includes a frequency generator (FG) 23 interlocking with the take-up capstan 4 and an amplifier 24 which converts signals output from the frequency generator 23 to clock pulse signals CK to supply them to both input terminals $\phi$ of the serial/parallel converter 18 and the parallel/serial converter 21. The system further includes an amplifier 25 and a cue signal detector circuit 26 which monitors a start cue signal (or an end cue signal) of the mother tape through the cue head 7 to provide a trigger pulse TP to a trigger pulse input terminal of the arithmetic circuit 19.

Operation of the signal processing system according to the present invention will be described hereinbelow. A mother tape 6, on which the start bit signal S and the number of traveling cycles previously executed are prerecorded according to the signal format as shown in FIG. 2, is wound around the first tape set reel 8.

First, the leader portion of the mother tape 6 is withdrawn form the tape set reel 8 and inserted into the loop-bin 2 via the take-up capstan 4 to be stored therein in meandering form, after which the leader of the mother tape is extracted through the supply capstan 3. During this initial operation, the recording/reproducing head 9 contacts the mother tape 6 being withdrawn to monitor the end cue signal recorded thereon for outputting it to an end cue detector circuit (not shown).

After detecting the end cue signal, the arithmetic circuit 19 is responsive to the start bit signal S to read out the data of the number of traveling cycles of the mother tape 6 which is stored in the data recording section 6f.

Figure 4:
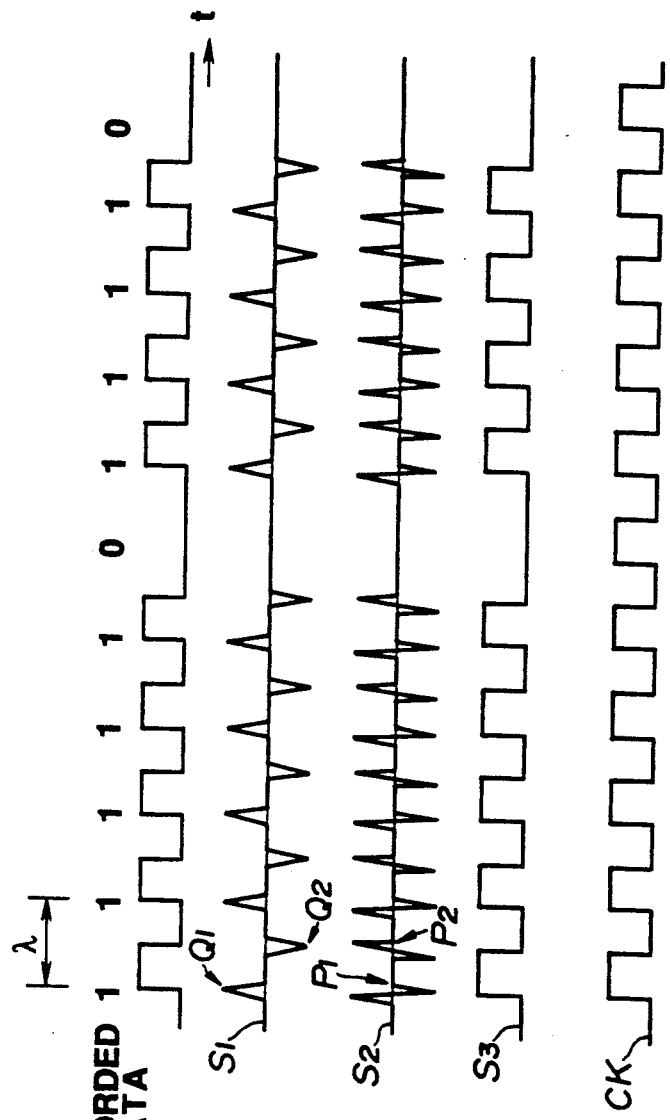
FIGS. 4(A) to 4(E) are a timing chart of signals of the signal processing system shown in FIG. 3.

On the data recording section 6f, binary data indicated by preselected bits, as shown in FIG. 4A, are recorded with a frequency of λ in such a manner that a high level signal "1" is represented by a pulse signal having a duty factor of 50% and a low level signal "0" is represented by zero level. Note that the horizontal axis of the FIG. 4 indicates time t based on clock pulses CK, as shown in FIG. 4E, created according to rotation of the take-up capstan 4. The data recorded on the data recording section 6f in the form of a pulse signal is reproduced by the recording/reproducing head 9 (this operation is equal to differentiation) and then amplified by the recording amplifier 15 to provide signal $S_1$ as shown in FIG. 4B. This signal is differentiated by the differential circuit 16 to provide signal $S_2$ as shown in FIG. 4c.

When the signal $S_2$ is input to the holding circuit 17, the holding circuit, as shown in FIGS. 4B to 4D, holds a high level "1" which corresponds to a level of the point $Q_1$ of the signal $S_1$ at a zero-cross point $P_1$ of a trailing edge of the signal $S_2$ and also holds a low level "0" which corresponds to a level of the point $Q_2$ of the signal $S_1$ at a zero-cross point $P_2$ of a leading edge of the signal $S_2$ to provide signals $S_3$. These signals $S_3$ have the same pattern as that of the data signals as shown in FIG. 4A and are input to the arithmetic circuit 19 synchronously with the clock pulse signals CK through the serial/parallel converter 18, serving as data which represents the number of traveling cycles of the mother tape. These data are then supplied to an indicator or display (not shown) to provide the total number of traveling cycles of the mother tape for indicating the current remainder of a life thereof to an operator precisely.

Subsequently, the trailer of the mother tape 6 is dislodged from the tape set reel 8 to b connected to the leader thereof on the panel 1 to form the splice area. By traveling the mother tape 6 and the copy tape 12 toward the take-up capstan 4 and the take-up reel 11 respectively (in a DM direction) at high speed while the copy tape 12 is pressed between the mother tape and the transfer drum 5, the magnetic patterns of the mother tape are transferred to the copy tape 12. During sequential duplicating operation, the mother tape 6 travels endlessly.

Assuming that a period of time, required for reversely transferring all information signals recorded on the mother tape 6 to the copy tape 12, is T, the cue head 7 contacts the start cue signal recording section 6a and the end cue signal recording section 6c in cycles of the T period. The cue signal detector circuit 26 outputs one trigger pulse signal TP to the arithmetic circuit 19 every cycle of the T period. The arithmetic circuit 19 is responsive to the trigger pulse signal TP to add "1" to the data representative of the number of traveling cycles of the mother tape 6 and update the display. It will be appreciated that the arithmetic circuit 19 adds "1" to the data in relation to the number of traveling cycles of the mother tape read out therefrom and an indicating value of the display is also increased by "1" at every production of a copy. When the indication of the display reaches the life of the mother tape 6 (for example 5000 traveling cycles), the operator stops the duplicating operation. Alternatively, it is preferable that the system may stop the duplicating operation automatically as soon as the number of traveling cycles has reached the life of the mother tape.

If the duplicating operation is stopped before the number of the traveling cycles of the mother tape reaches the life thereof, the operator cuts the mother tape 6 at the splice area and then winds the trailer thereof around the tape set reel 8 by a preselected length. After this, the take-up capstan 4 is rotated to feed the mother tape 6 in the DM direction and the recording/reproducing head 9 monitors the end one signal of the mother tape. When the end cue signal is detected, the arithmetic circuit 19 controls the switching circuit 14 to be changed to the second fixed contact which is connected to the ground so as to form the blank section 6d having the length L. After forming the blank section 6d, the arithmetic circuit 19 switches the movable contact of the switching circuit 14 to be changed to the third fixed contact and then outputs a start bit signal S and a data signal representing the total number of traveling cycles of the mother tape 6 to be record on the sections 6d and 6e of the mother tape through the delay circuit 20, the parallel/serial converter 21, the amplifier 22, and the recording/reproducing head 9.

As previously mentioned, in the above system, only one operation is effected for reproducing data of the number of traveling cycles from the mother tape or for recording an updated data thereon while the mother tape is withdrawn from or taken up around the tape set reel 8. Therefore, a period of time where the recording-/reproducing head 9 contacts a surface of the mother tape is very short, resulting in minimum wear of the mother tape.

After recording the data of the number of traveling cycles of the mother tape, the operator stops the rotation of the take-up capstan 4 winding the mother tape around the tape set reel 8 completely. When copies are further produced utilizing that mother tape 6, the mother tape is loaded onto the duplicator again and the above described operations are repeated.

With the above arrangement, the data of the number of traveling cycles recorded on the data recording section 6f of the mother tape is also recorded on the copy tape 12 and thus the same data, that is the number of traveling cycles executed before the current reproducing operation, is stored on the copy tapes produced in one sequential duplicating operation. In other words, if a reproducing operation is undertaken with a mother tape which has, for example, 3500 previously executed cycles, and a new operation consisting of 1000 cycles is begun, the data encoded on the mother tape 6 itself is not updated until the end of the new operation. Therefore if the operation is begun at 3500, all copy tapes made in the operation will be encoded with the same number (3500). For avoiding this, the data of the number of traveling cycles of the mother tape 6 which are successively updated by the arithmetic circuit 19 may be recorded on successive copy tapes through the recording head 13 as shown in FIG. 1. It will be noted that by this arrangement the operator can identify which duplicating cycle a given copy tape has been produced in. This further facilitates quality control of the copied tapes.

Figure 5:
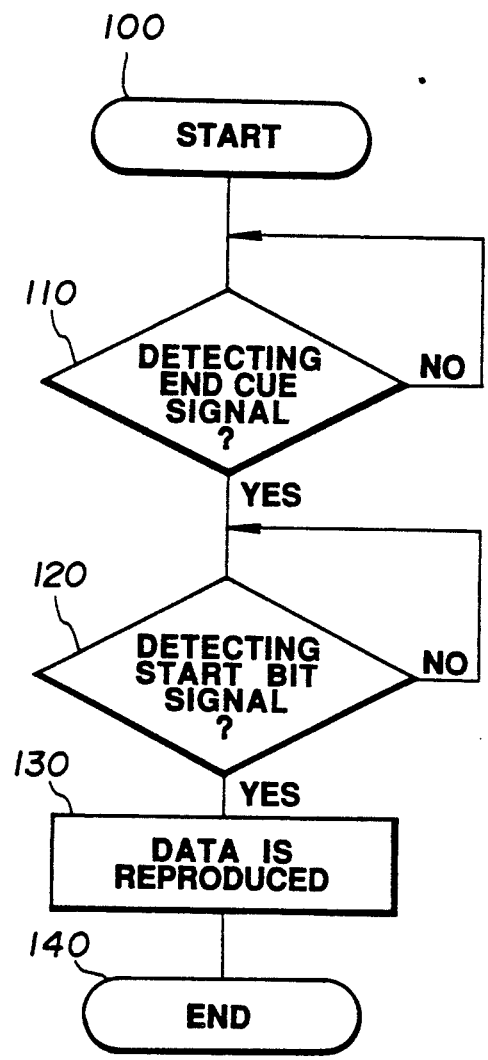
FIGS. 5 and 6 are flow charts which programs, or sequences of logical steps, for recording and reading the number of traveling cycles of a mother tape in a duplicator system on the mother tape, performed by a system as shown in FIG. 3.
Figure 6:
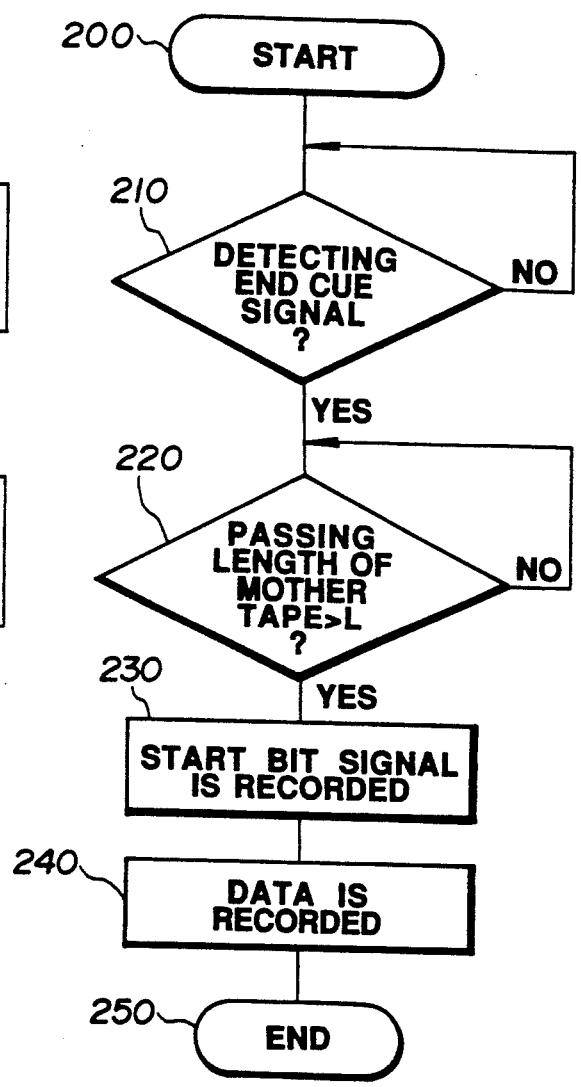

Referring to FIGS. 5 and 6, flowcharts are shown of programs controlling the recording and reproducing operations of the number of traveling cycles of the mother tape as performed by the system shown in FIG. 3.

After entering the program in reproduction start step 100, the routine proceeds to step 101 wherein it si determined as to whether the end cue signal recorded in the end cue signal recording section 6c of the mother tape is detected by the recording/reproducing head 9 or not. If a YES answer is obtained, the routine then proceeds to step 120 wherein the start bit signal S recorded on the recording section 6e is also detected by the recording-/reproducing head or not. If a YES answer is obtained, the routine then proceeds to step 130 wherein the data of the number of traveling cycles of the mother tape recorded on the data recording section 6f is input to the arithmetic circuit 19 and the arithmetic circuit adds "1" to the number of traveling cycles of the mother tape to update the data. The routine proceeds to step 140 wherein the program terminates.

For recording the data updated in step 130 on the mother tape, after entering the program in recording start step 200, the routine proceeds to step 210 wherein it is determined whether the end cue signal recorded in the end cue signal recording section 6c of the mother tape is detected by the recording/reproducing head 9 while the mother tape 6 is taken up by the tape set reel 8. If a YES answer is obtained, the routine then proceeds to step 220 wherein it is determined whether the mother tape passes from the end cue signal recording section 6c by the length L or not. If a YES answer is obtained, the routine proceeds to step 230 wherein the start bit signal S is recorded on the mother tape 6. The routine then proceeds to step 240 wherein the data updated in step 130 is recorded on the mother tape and the program terminates in step 250.

With the system of the invention, when sequential duplicating operation is completed, data of the total number of traveling cycles of the mother tape is recorded on the mother tape without affecting the cue signal recording sections 6a and 6c and the video signal recording section 6b. Even when various types of copy tapes are produced every lot utilizing different mother tapes, the number of traveling cycles of each the mother tape is known precisely by the operator to manage the remainder of the life thereof safely.

While in the above embodiment, the arithmetic circuit 19 is responsive to the start cue or the end cue signal to add "1" to the number of traveling cycles of the mother tape 6, the arithmetic circuit may be responsive to the passing of the slice area of the mother tape to update the data of the number of traveling cycles. Additionally, the recording/reproducing head 9 may be provided with separate recording and reproducing heads which are arranged on the panel 1 adjacent to each other.

Figure 7:
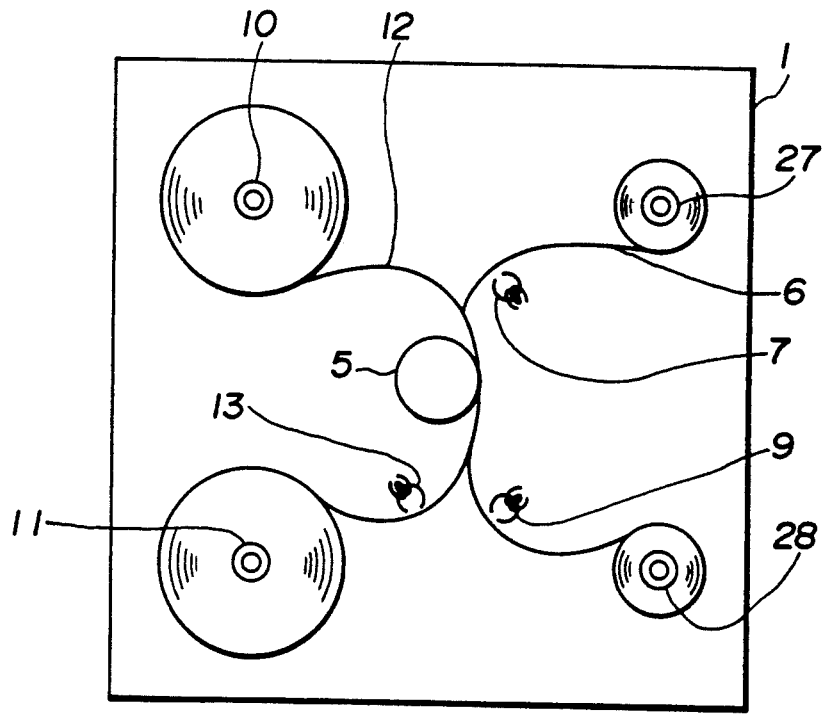
FIG. 7 is a front view which shows a second embodiment which a system of the invention is applied to a shuttle type duplicator.

Referring to FIG. 7, and alternate embodiment of the invention is shown. The shown duplicator is a shuttle type duplicator to which the same signal processing system as the above embodiment is applied. As to elements common to the embodiment of FIG. 1, like numbers refer to like parts and description thereof will be omitted.

The shuttle type duplicator includes generally a mother tape supply reel 27 and a mother tape take-up reel 28 which are arranged on a panel 1. During duplicating operation, the supply reel 27 feeds a mother tape 6 to the take-up reel 28 through a cue head 7, a transfer drum 5, and a recording/reproducing head 9. After all information signals recorded on the mother tape 6 are transferred to a copy tape 12 and supply of all copy tape 12 is completed, the duplicating operation is stopped to rewind the mother tape around the supply reel 27.

In this embodiment, reading out data of the total number of traveling cycles of the mother tape until now is made by means of the recording/reproducing head 9 at the initial stage of sequential duplicating operation. Recording the updated data of the number of traveling cycles on the mother tape is effected at the final stage of the sequential duplicating operation. Other operations are the same as those of the first embodiment.

Figure 8:
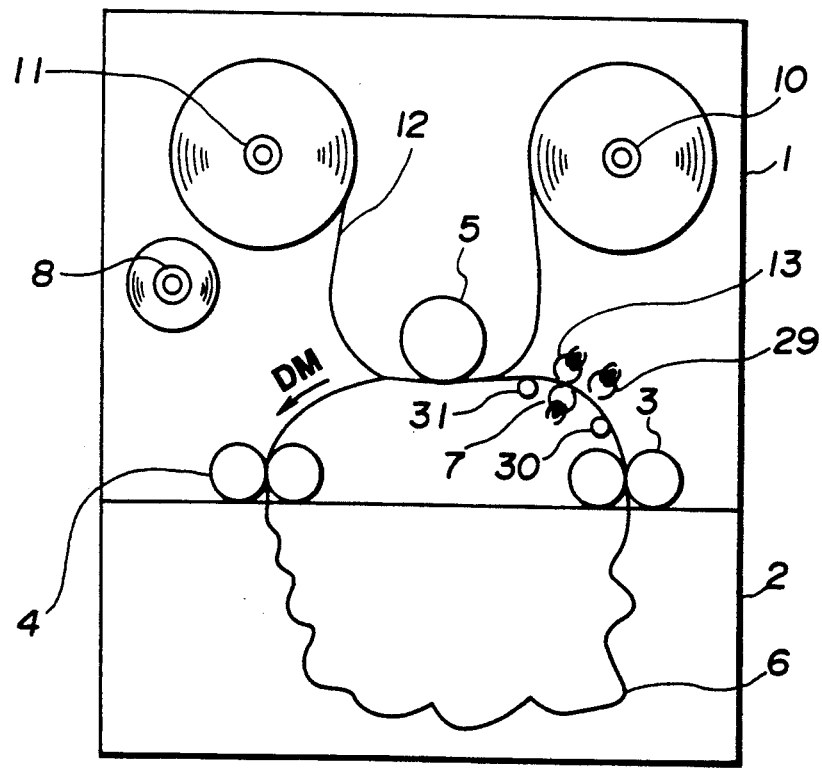
FIG. 8 is a front view which shows a third embodiment according to the invention.
Figure 9:
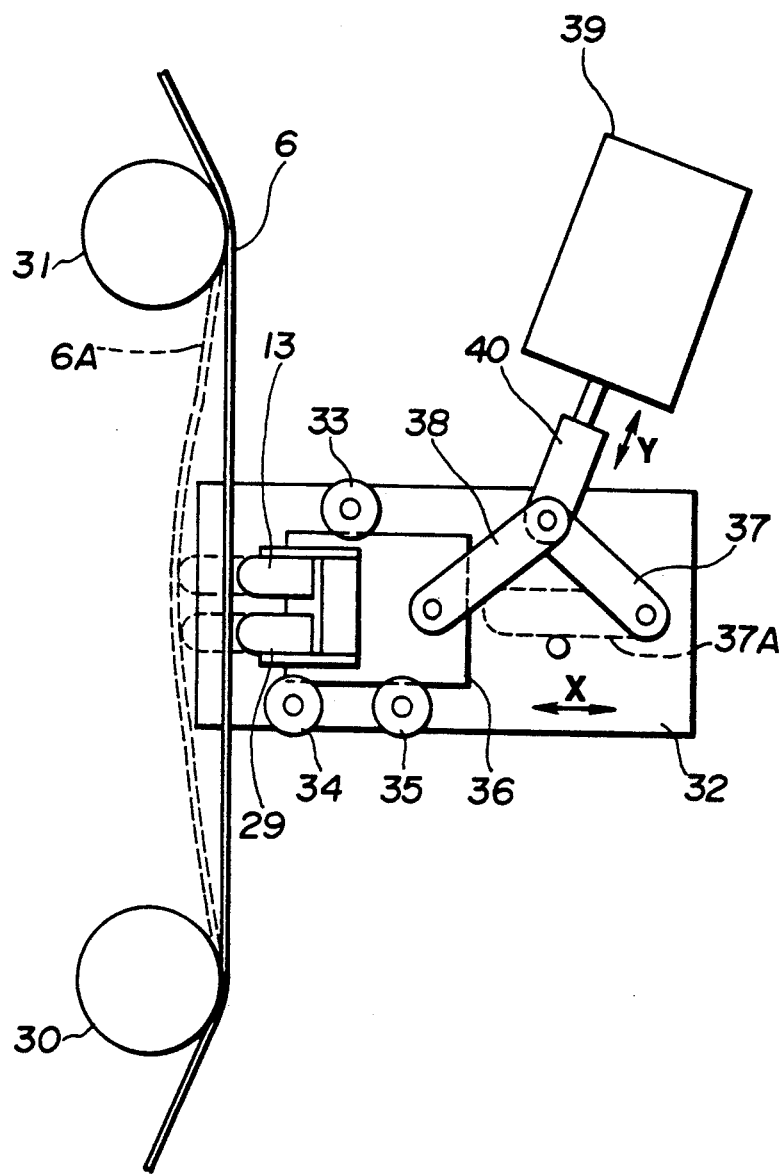
FIG. 9 is an enlarged front view which shows a mechanism shifting a pair of recording and reproducing heads onto a mother tape only during recording or reproducing operations.
Figure 10:
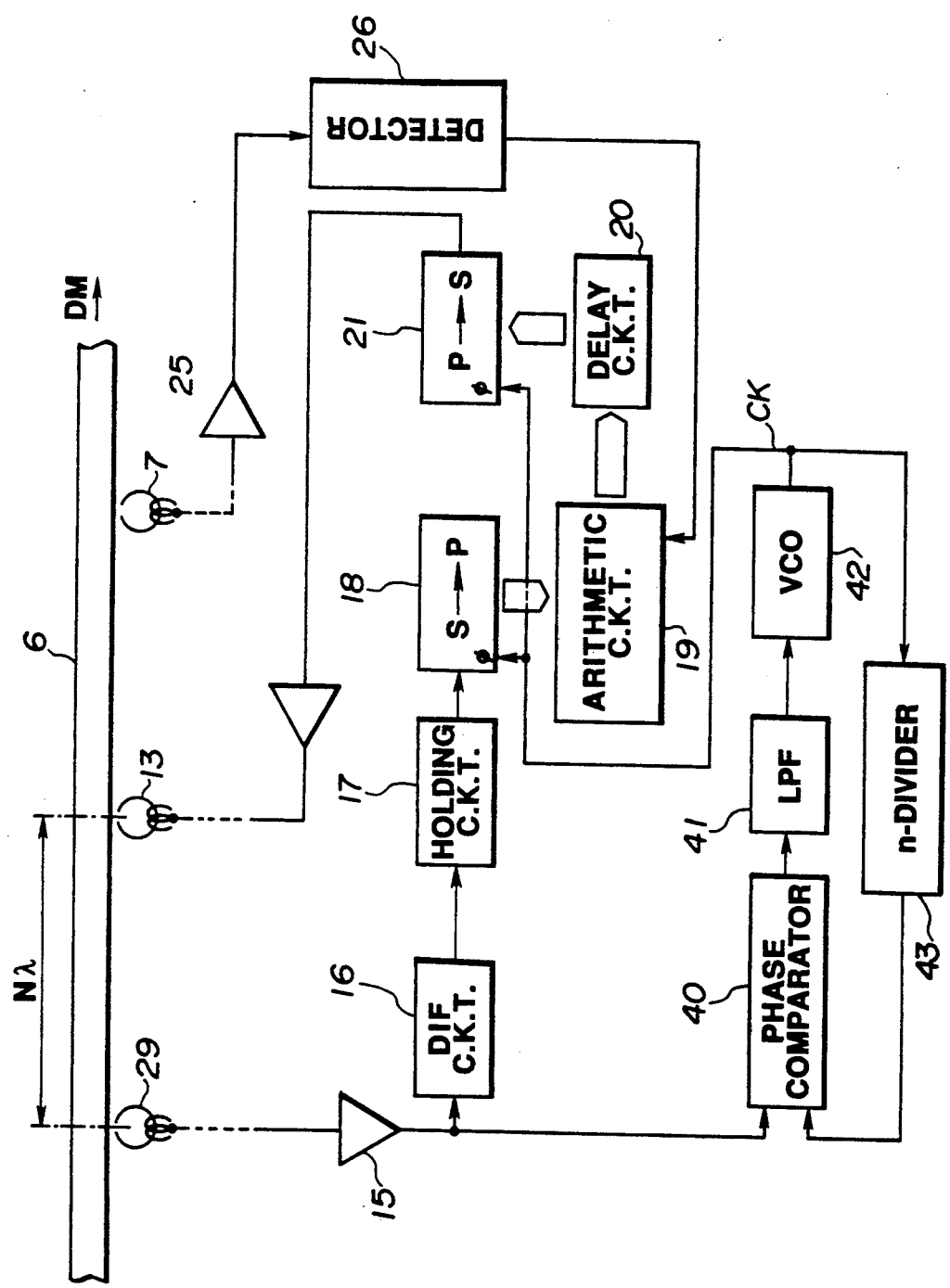
FIG. 10 is a block diagram which shows a signal processing system applicable to a duplicator system as shown in FIG. 8.

Referring to FIGS. 8 to 10, a third embodiment of the invention is shown which is a variant of the loop-bin type duplicator of the first embodiment.

The duplicator includes tape guide pins 30 and 31 which are disposed on a panel 1 between a mother tape supply capstan 3 and a transfer drum 5. Between the tape guide pins 30 and 31, a cue head 7, a recording head 13, and a reproducing head 29 are provided. In this embodiment, reading out data on the number of previously executed traveling cycles from the mother tape 6 is effected every traveling cycle of the mother tape for producing a reel of copy tape. After adding "1" to this read out data, the updated data of the number of traveling cycles of the mother tape 6 is recorded on the mother tape by the recording head 13 immediately. The data of the number of traveling cycles updated every duplicating operation is also recorded on a copy tape by the transfer drum 5. It will be appreciated that, according to this system, provision of a separated recording head for copy tapes is unnecessary.

The duplicator further includes a mechanism, as shown in FIG. 9, which is adapted for shifting the reproducing head 29 and the recording head 13 to contact them with the mother tape 6 only when data of the number of traveling cycles is reproduced from or recorded on the mother tape for preventing wear caused by continuous contact between the mother tape and the heads. The mechanism includes generally a base plate 32 mounted on the panel 1, a sliding plate 36 on an end of which the reproducing head 29 and the recording head 13 are arranged parallel to each other, bearings 33 to 35 for supporting the sliding plate, and linkages 37 and 38 connecting the sliding plate and the base plate. The bearings 33 to 35 serve to orient the sliding plate 36 slidingly in an X direction. The mechanism further includes a plunger 39 installed on the panel 1 which has a movable shaft reciprocating in a Y direction traversing the X direction. An end of the movable shaft is attached to a connection between the linkages 37 and 38 so as to allow a certain amount of play.

With this arrangement, extension of the movable shaft causes the linkage 37 to be displaced toward a position 37A indicated by a broken line, thereby thrusting the sliding plate 36 to the mother tape to establish contact between the reproducing and recording heads 29 and 13 and the mother tape with the mother tape being pushed toward a position 6A indicated by a broken line. It will be appreciated that easy control of stroke motion of the plunger 39 achieves contact between the reproducing and recording heads 29 and 13 and the mother tape 6 for a period of time required for reproducing or recording data signals from or on the mother tape. This results in minimum wear of a surface of the mother tape caused by contact between the heads 29 and 13 and the mother tape.

Referring to FIG. 10, a signal processing system of the third embodiment is shown. This system includes reproducing and recording heads 29 and 13 separate from each other and a PLL (Phase Locked Loop) circuit which is provided with a VCO 42 (Voltage-Controlled Oscillator) and a n-frequency divider 43 to produce clock pulses CK based on signals from the reproducing head 29. Signals reproduced by the reproducing head 29 are converted to the clock pulses CK through an amplifier 15, a phase comparator 40, a LPF 41 (Low-Pass Filter), and the PLL circuit. These clock pulses CK are then supplied to both clock terminals $\phi$ of a serial/parallel converter 18 and a parallel/serial converter 21.

An interval between the reproducing and recording heads 29 and 13 is defined by $N\lambda$ denotes a wavelength of a one bit signal forming data of the number of traveling cycles to be recorded on the data recording section 6$f$ of the mother tape 6 and N denotes a preselected constant (see FIGS. 2 and 4A). With this arrangement, by adjusting a value of N and a delay time set by a delay circuit 20 (integer times of a cycle of the clock pulse CK), the recording head 13 records the data of the number of traveling cycles updated by an arithmetic circuit 19 on the data recording section 6$f$ of the mother tape, which is moving in direction DM synchronously with the clock pulses CK, precisely.

Also, in this embodiment, updating data of the number of traveling cycles of the mother tape by adding "1" thereto is effected in the arithmetic circuit 19 in response to input of a trigger pulse TP generated based on signals reproduced by the cue head 7. The trigger pulse TP is such that only one pulse is provided to the arithmetic circuit 19 during one traveling cycle of the mother tape 6. In response to this pulse, the arithmetic circuit 19 provides an input plag of high level. The arithmetic circuit 19 is responsive to input of data of the number of traveling cycles from the reproducing head 29 to add "1" to that data and outputs the updated data to the recording head 13 with an input flag being set to a low level "0". The input flag of low level disenables mathematical addition of "1" to the data of the number of traveling cycles from being effected even when the data of the number of traveling cycles is input to the arithmetic circuit 19. Thus, location of the cue head 7 may be anywhere on the panel 1.

Figure 11:
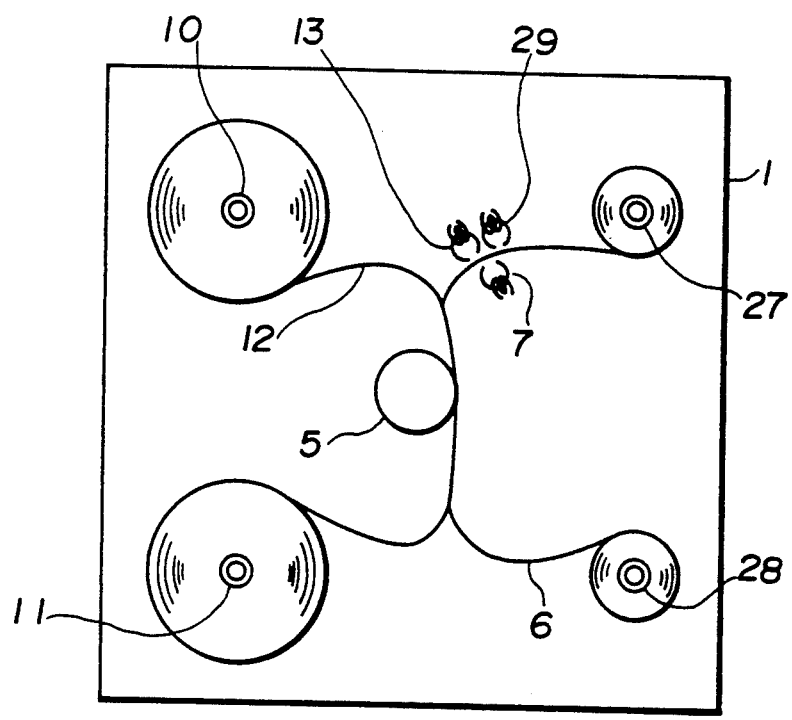
FIG. 11 is a front view which shows a fourth embodiment of the invention.

Referring to FIG. 11, a fourth embodiment of the invention is shown. This embodiment is modification of the above third embodiment, applied to a shuttle type duplicator. The same reproducing, recording, and cue heads 29, 13, and 7 as those of the third embodiment are provided between a mother tape supply reel 27 and a mother tape take-up reel 28. In a system of this embodiment, clock pulses CK, as shown in FIG. 10, are provided based on signals reproduced by the reproducing head 29 which are different form the first embodiment in that the clock pulses CK are generated based on rotation of the capstan 4 in the first embodiment. Thus, capstans similar to the first embodiment are unnecessary. Operation of the fourth embodiment is substantially the same as that of the third embodiment except that the mother tape must be rewound around the supply reel 27 after one traveling cycle thereof is finished.

Figure 12:
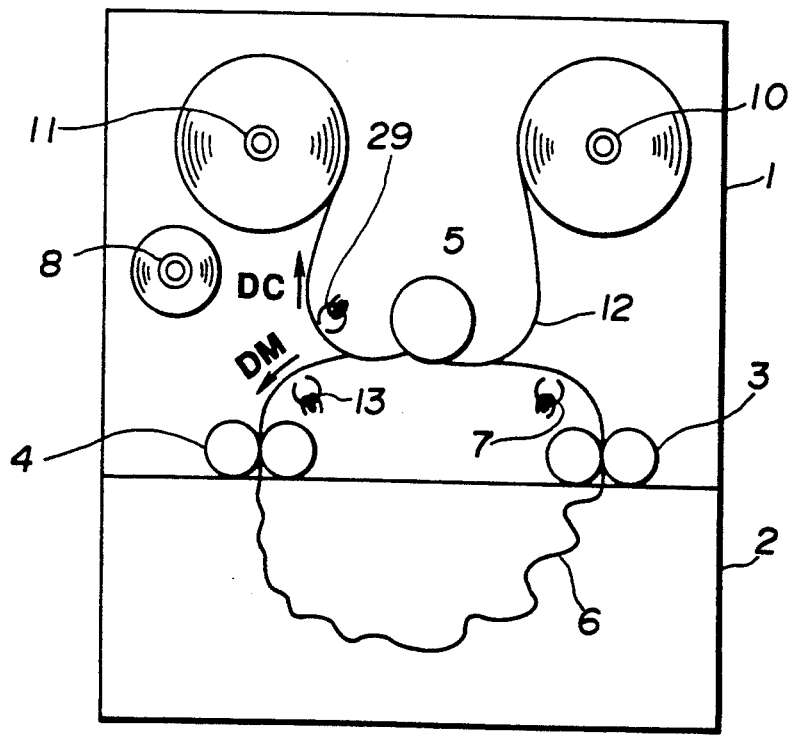
FIG. 12 is a front view which shows a fifth embodiment of the invention.
Figure 13:
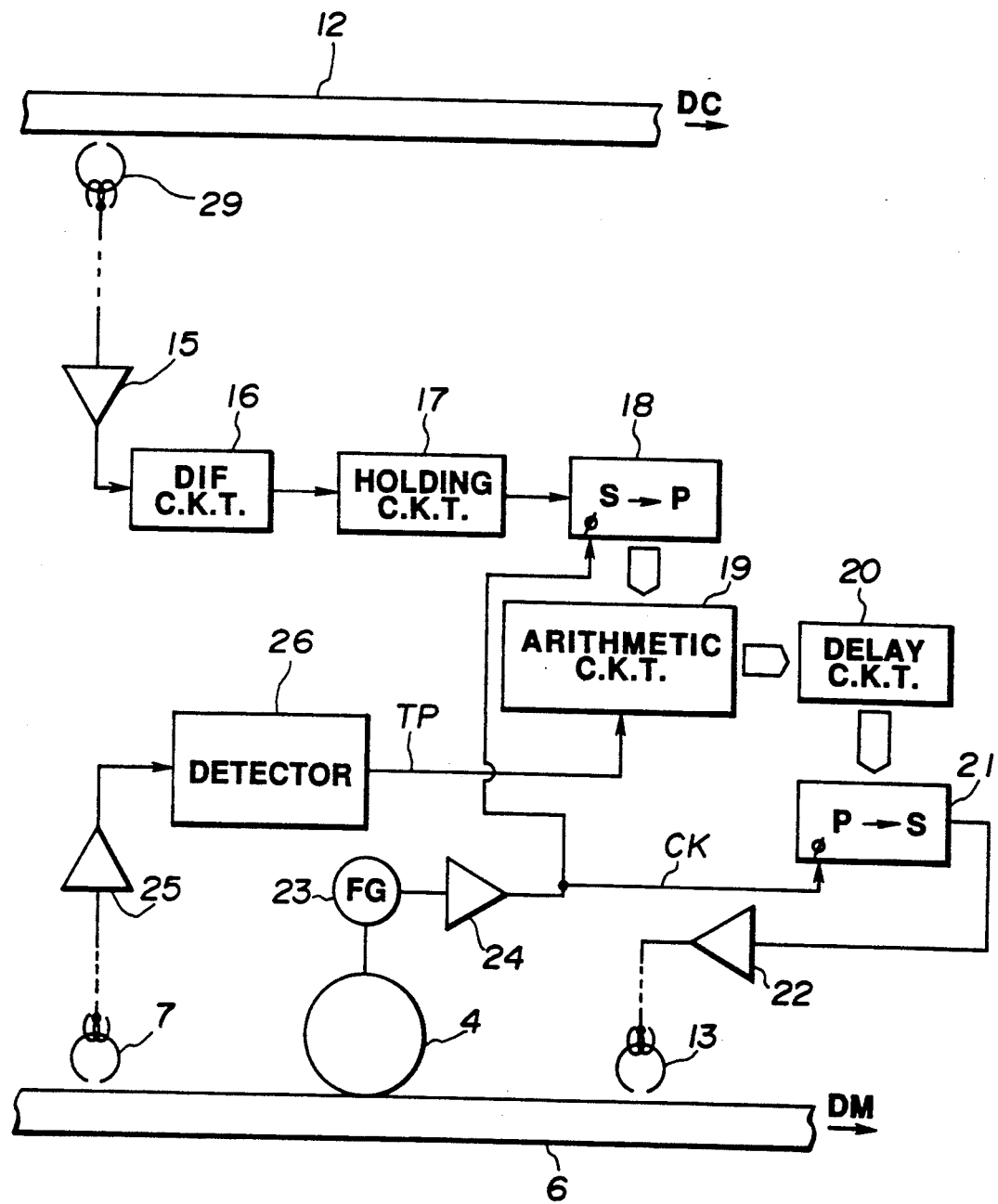
FIG. 13 is a block diagram which shows a signal processing system applicable to a duplicator system as shown in FIG. 12.

Referring to FIGS. 12 and 13, a fifth embodiment of the present invention is shown. This embodiment is a variant of the second embodiment shown in FIG. 7, applied to a loop-bin type duplicator.

A duplicator of this embodiment includes a copy tape reproducing head 29 arranged between a transfer drum 5 and a copy tape take-up reel 11, a cue head 7 arranged between a mother tape supply capstan 3 and the transfer head 5, and a mother tape recording head 13 arranged between the transfer drum 5 and a mother tape take-up capstan 4.

Referring to FIG. 13, a signal processing system of the fifth embodiment is shown. In this system, signal output from a FG (Frequency Generator) 23 which is interlocked with the take-up capstan 4 are converted into clock pulses CK through an amplifier 24. These clock pulses CK are then supplied to both clock terminals $\phi$ of a serial/parallel converter 18 and a parallel/serial converter 21.

In operation, a mother tape 6 on which data of the total number of traveling cycles until now is recorded and a copy tape 12, traveling in directions DM and DC respectively, with tight contact with each other on the transfer drum 5 causes the data of the number of traveling cycles to be directly transferred on the copy tape 6 in addition to information signals such as video signals form the mother tape. It will be appreciated that the updated data of the number of traveling cycles are transferred on corresponding copied tapes respectively to provide quality control benefits for the copied tapes.

Additionally, the reproducing head 29 reads out the data of the number of traveling cycles transferred on the copied tape 12. The arithmetic circuit 19 adds "1" to the read out data and the recording head 13 then records the updated data on the data recording section 6$f$ of the mother tape 6 again. Similarly to the above embodiments, a trigger pulse TP provided based on signals reproduced by the cue head 7 is supplied to the arithmetic circuit 19. The arithmetic circuit 19 effects updating operation of the number of traveling cycles of the mother tape only while the one trigger pulse is input to the arithmetic circuit. Thus, location of the cue head 7 is not limited to a particular position on the panel 1.

Figure 14:
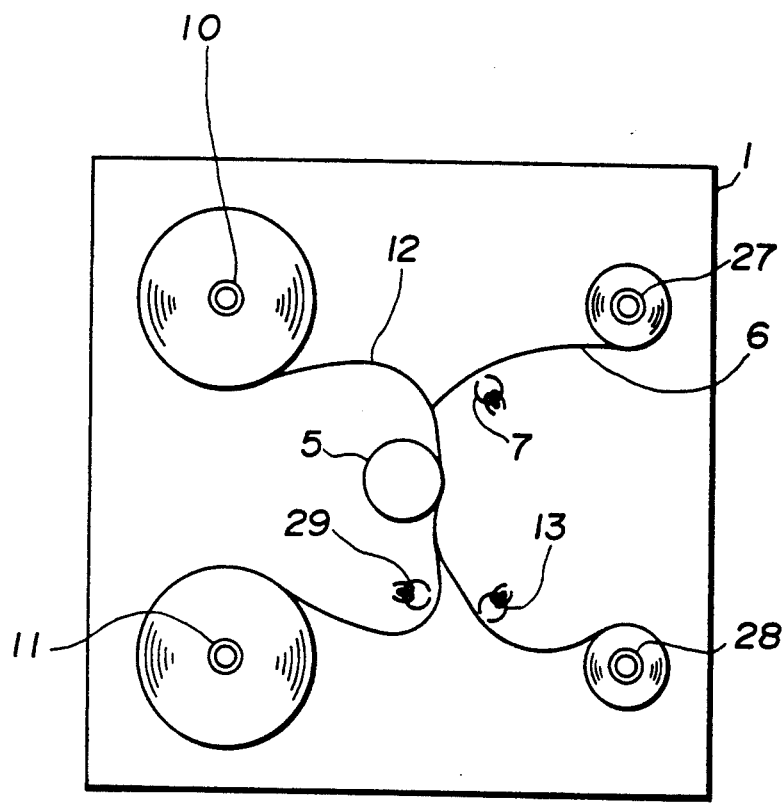
FIG. 14 is a front view which shows a sixth embodiment of the invention.

Referring to FIG. 14, a sixth embodiment is shown which is similar to the above fifth embodiment, applied to a shuttle type duplicator and includes a mother tape supply reel 27 and a mother tape take-up reel 28. Operation of this duplicator is substantially the same as that of the fifth embodiment, but is different therefrom in that rewinding a mother tape around the supply reel 27 is necessary every termination of traveling of the mother tape during sequential duplicating operation.

Figure 15:
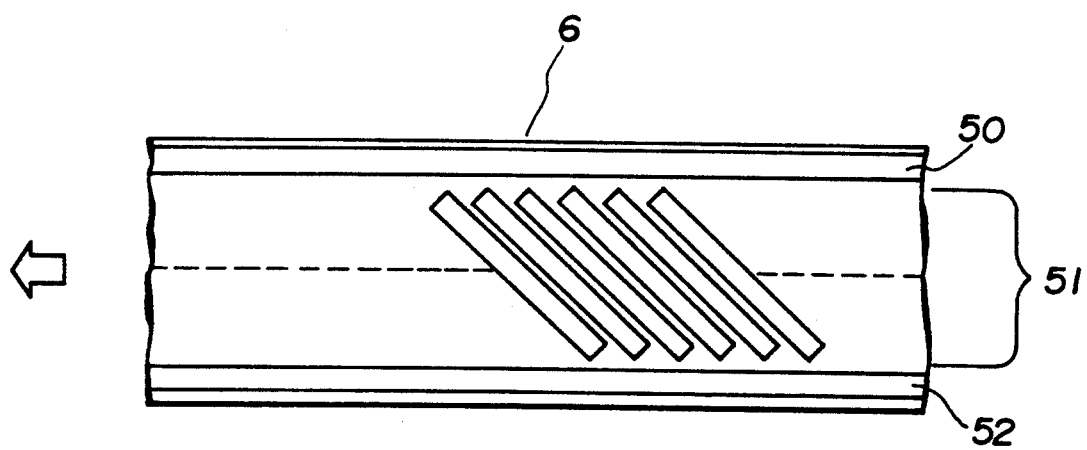
FIG. 15 is a view which shows a tape format of a mother tape.

In the above embodiments, a data signal of traveling cycles of the mother tape and video signals are, as shown in FIG. 2, recorded at separate longitudinal portions of the tape. These signals may be however recorded on longitudinal tracks separated in the width direction of the tape. This type of format is illustrated in FIG. 15, accomplished by recording the data signal of the number of traveling cycles together with control signals on a control track 52 of the mother tape which is provided with helical video signal tracks 51, an audio signal track 50, and the control signal tack 52 for controlling tape speed.

Figure 16:
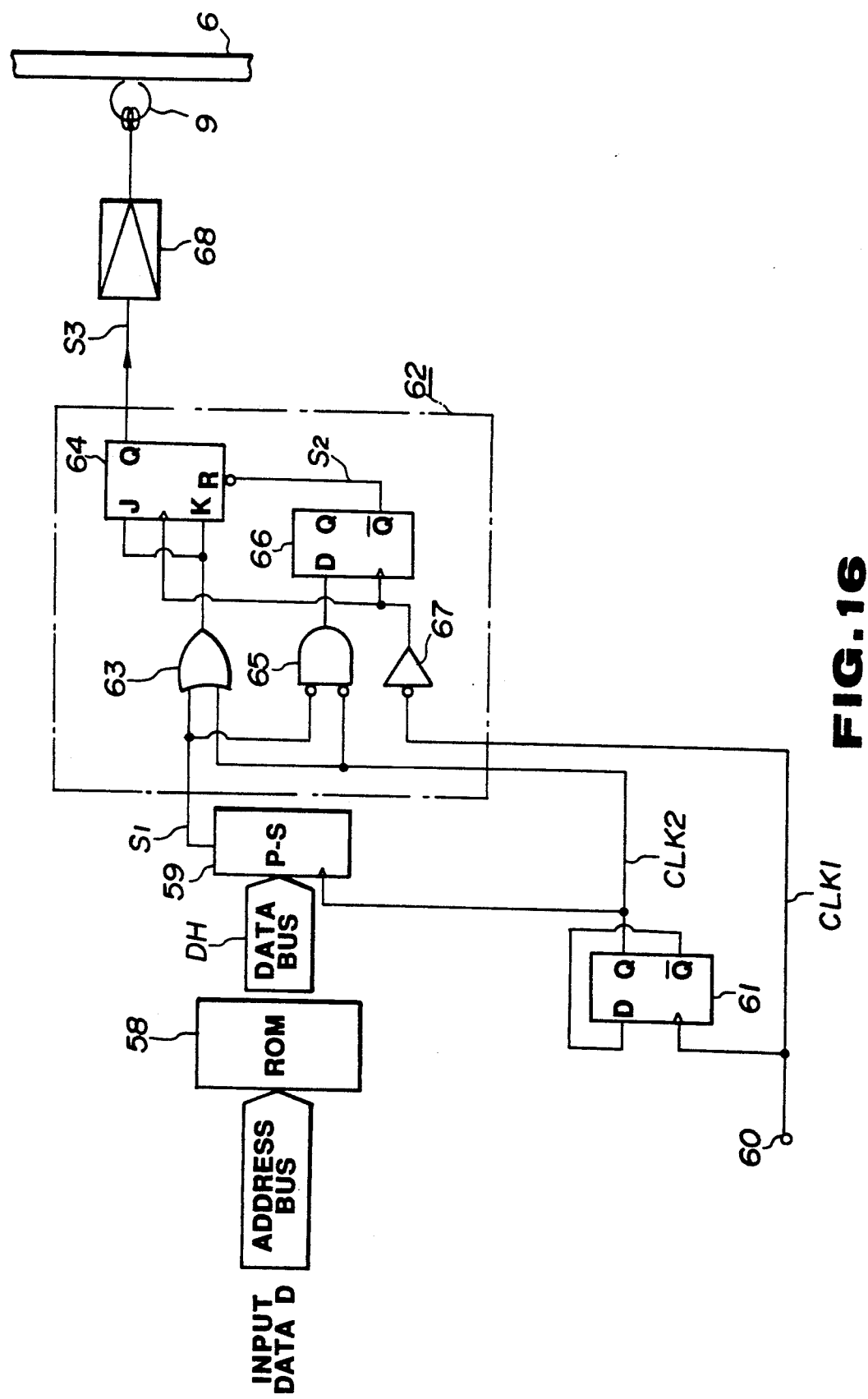
FIG. 16 is a circuit block diagram which shows a recording system of an alternate embodiment.

Referring to FIG. 16, a recording system is shown which records data of the number of traveling cycles of the mother tape together with control signals on the control track 52 of the mother tape 6. Eight bit data D input to this recording system is data of the traveling cycles of the mother tape which is provided from the arithmetic circuit 19 in the above embodiments. In FIG. 16, numeral 58 denotes a ROM (Read Only Memory) as a conversion table to convert the eight bit data D into 16-bit data DH. The data D is supplied to the eight bit address bus, the data DH after the conversion being red from the 16-bit data bus of the ROM 58. The action of the conversion table is to convert the eight bit data D (values 0 through 255) into data 16 bit data DH in which two or more low level "0" intervals do not occur adjacently.

In general, n (n denotes a positive integer) bit data ($a_{n-1}$, $a_{n-2}$, —, $a_0$) corresponds to 2 n bit data ($1a_{n-1}$, $1a_{n-2}$, —, $1a_0$), respectively. The 2 n bit data can be prevented from containing two or more adjacent low level "0s". However, although the 8-bit data contains only 256 different bits patterns, the 16-bit data may contain 65536 different bit patterns. Therefore, the required 16-bit data are selected from the ROM table data so as to obtain to 16 bit data in which the low level "0" does not occur consecutively even if derived from eight bit data in which "0" values do occur consecutively and, the high level "1" values between "0" and "0" always occur in sequences of two or more as shown in the Table. Although various types of methods may be considered as the conversion method, the number of consecutive "0s" may be held below a predetermined number.

TABLE 1

| 8-bit data (decimal Repre.) | 16-bit data |
|---|---|
| 9 | 1101101101110110 |
| 10 | 1111101101110110 |
| 11 | 1111011101110110 |
| 249 | 1110110110111111 |
| 250 | 1101110110111111 |

The data DH of 16 bits read from the ROM 58 is supplied to a serial-to-parallel (P/S) converter (shift register) 59. In addition, numeral 60 denotes an input terminal.

In addition, a clock pulse CLK 1 having a predetermined frequency is externally supplied to the input terminal 60. The clock pulse CLK 1 is converted into a clock pulse CLK 2 having half the frequency of CLK 1, via a D type flip-flop circuit 61 as a frequency divider. The clock pulse CLK 2 is supplied to the clock terminal of a parallel-to-serial converter 59.

Numeral 62 denotes a modulation circuit for carrying out a special bi-phase mark modulation. Bi-phase mark modulation is a modulation method in which a level inversion is always carried out at a boundary of an interval (bit cell) representing each bit, the level inversion is carried out at the center of the bit cell when the data indicates the high level, and the level inversion is not carried out when the data indicates the low level "0". This bi-phase modulation is a kind of FM modulation and also a channel coding.

The special Bi-phase mark modulation is the same as above mentioned Bi-phase mark modulation except that the level inversion is not carried out at the boundary between the bit cell of the data of "0" and the bit cell of the subsequent data "1".

The reason that the special bi-phase mark modulation is used is as follows:

In normal bi-phase mark modulation, if the low level "0" is continued by an odd number, a phase relationship before and after the low level of "0" is reversed. Therefore, if the post-modulation signal is used as the control signal, a phase on a rising (or falling) edge of the pulse is changed by 180°. This is very inconvenient. On the other hand, in the special bi-phase mark modulation of the preferred embodiment, the phase relationship before and after the low level of "0" can be maintained. The phase of the rising and falling edge of each pulse is always the same.

The speed servo control using the control signal is advantageously preferable.

Next, a specific circuit construction of the modulation circuit 62 will be described below.

As shown in FIG. 16, a signal $S_1$ output serially from a parallel/serial converter 59 is supplied into one input terminal of an OR gate circuit 63 and an input terminal of a negative logic AND gate circuit 65. The clock pulse CLK2 output from the D type flip-flop circuit 61 is supplied to the other input terminal of an OR gate circuit 63 and the other input terminal of the AND gate circuit 65. Then, since the output signal of the OR gate circuit 63 is supplied to the J and K terminals of a JK flip-flop circuit 64 of a synchronization reset type, and the output signal of the AND circuit 65 is supplied to a D terminal of the D type flip-flop circuit 66. The clock pulse CLK1 supplied to the input terminal 60 is supplied to clock terminals of the flip-flop circuits 64 and 66 via an inverter circuit 67, respectively.

In addition, the inverted output signal $S_2$ of the D-type flip-flop circuit 66 is supplied to the reset terminal of the J-K flip-flop circuit 64. The output signal of the AND gate circuit 65 is supplied to the D type flip-flop circuit 66, the clock pulse CLK1 supplied to the input terminal 60 is supplied to the respective clock terminals of the flip-flop circuits 64 and 66 via an inverter 67.

As mentioned above, the reversed output signal $S_2$ of the D type flip-flop circuit 66 is supplied to the reset terminal of the J-K flip-flop circuit 64. Also, the output signal $S_3$ of the J-K flip-flop circuit 64 (,i.e., output signal of the modulation circuit 62) is supplied to a head 9 via the recording amplifier 68. A magnetizing pattern (data of the number of traveling cycles of the mother tape) based on the output signal $S_3$ is recorded on the control track 52 of the mother tape 6.

An operation in a case wherein the 16-bit data DH (—11011101—) in which the input data D is converted will be described with reference to FIG. 17.

Figures 17A, 17B, 17C, 17D, 17E:
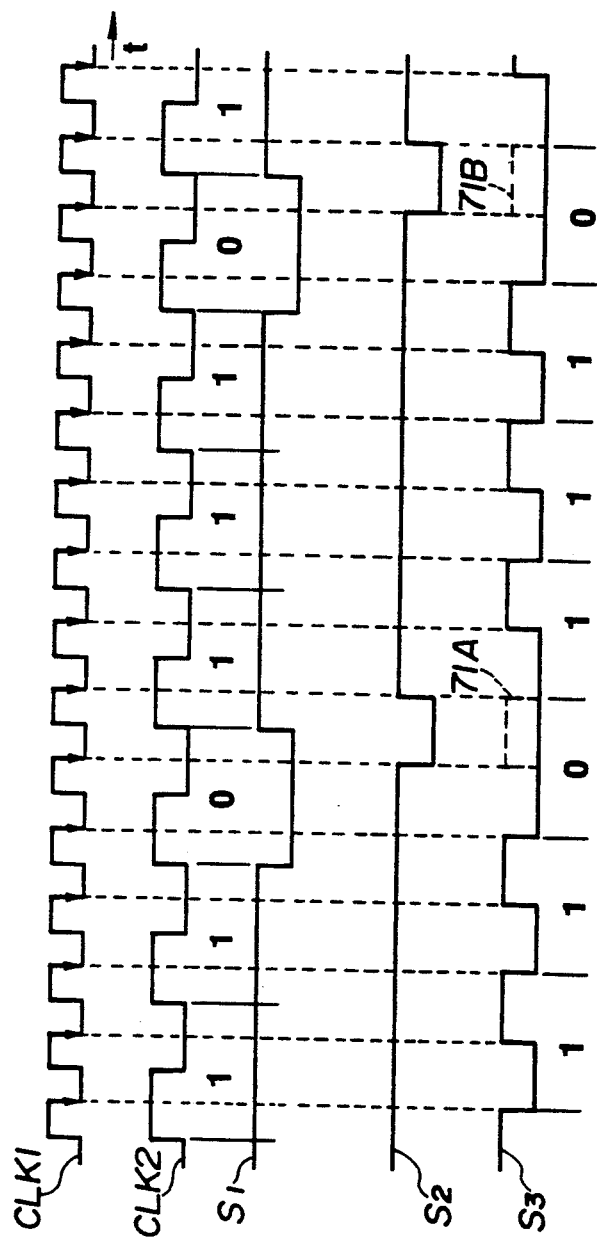
FIGS. 17(A) to 17(E) are timing charts of signals of essential circuits shown in FIG. 16.

In this case, the data DH is shifted in synchronization with the clock pulse CLK2 (FIG. 17 (B)) to provide a signal $S_1$ (FIG. 17 (C)). The end of the data of the signal $S_1$ corresponds to the rising edge of the clock signal CLK2. In addition, the clock pulse CLK1 (refer to FIG. 17 (A)) is a signal whose frequency is twice the clock pulse frequency CLK2. The signal $S_2$ provides the low level of "0" only when the inverted clock pulse CLK1 rises with both the signal $S_1$ and clock pulse CLK2 at the low levels of "0" (,i.e., the actual clock pulse CLK1 falls) so that the signal $S_2$ provides the low level "0" only in the vicinity to an interval of a low level "0" of the signal $S_1$ as shown in FIG. 17 (D).

In addition, when the J-K flip-flop circuit 64 serves as a binary counter when the input signals of the J and K terminals of the J-K flip-flop circuit 64 are at the high levels of "1". When both of the J and K terminals are at low levels of "0", the same output data is maintained.

In addition, when the output signal S₃ of the J-K flip-flop circuit 64 has received the clock pulse with the signal S₂ at the low level of "0", the output signal S₃ is forcibly set to the low level of "0". The waveform of the signal S₃ is shown in FIG. 17 (E). That is to say, the waveform of the signal S₃ is such that the pulses 71A, 71B, —, are removed. The special bi-phase modulation is such as to generate the signal S₃ (FIG. 17. (E)) from the signal S₁ (FIG. 17 (C)).

In the preferred embodiment, since the redundancy of the signal S₃ as the record data corresponding to the input data D is twice the input data and, therefore, the redundancy is small as compared with previously proposed modulation methods, a large amount of auxiliary data can be recorded over a relatively short control track.

Figure 18:
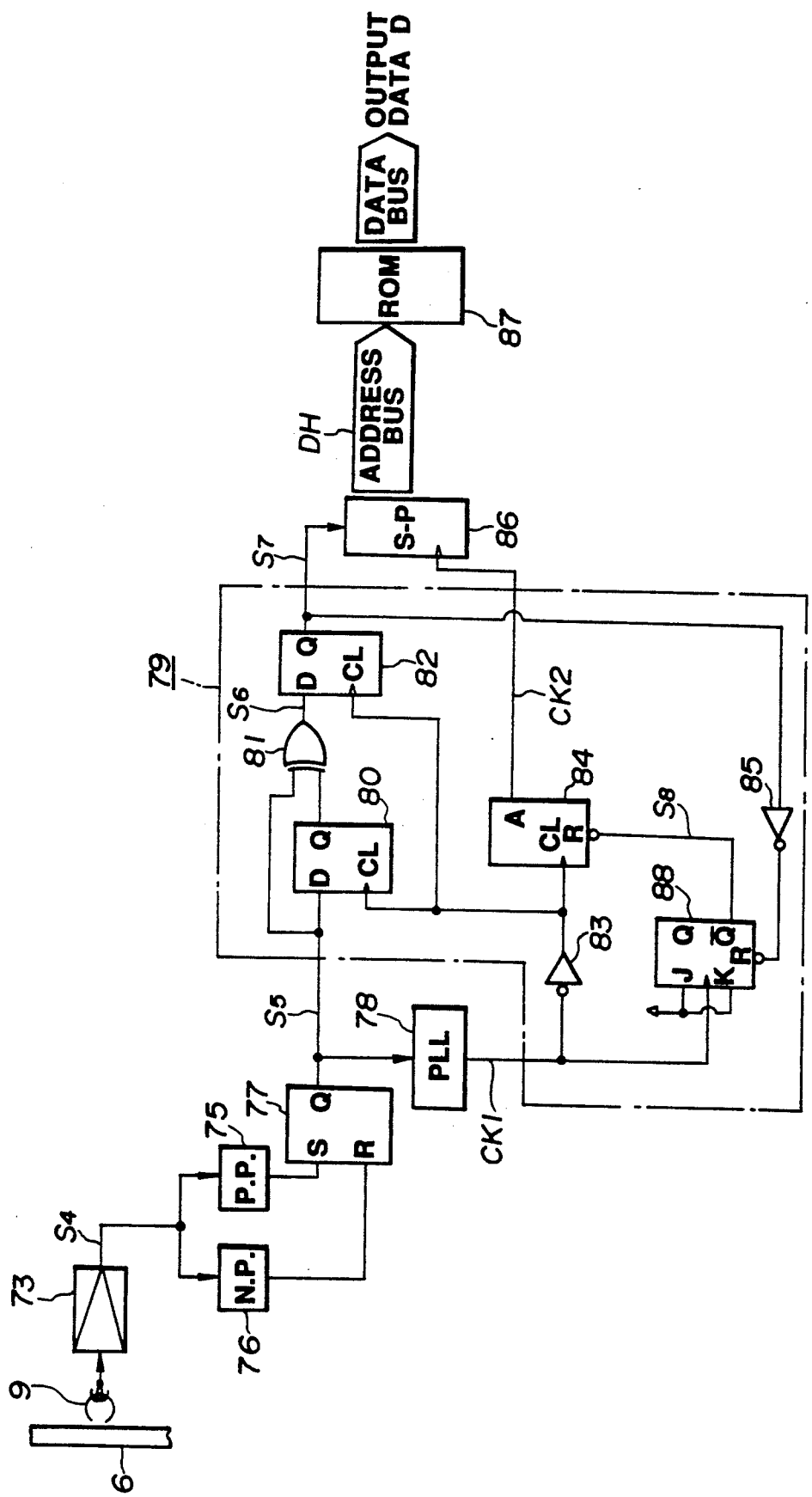
FIG. 18 a circuit block diagram which shows a reproducing system of an alternate embodiment.

Referring to FIG. 18, a reproducing system is shown.

A signal S₄ is generated via the head 9 and reproducing amplifier 73 from a control track on which the data of the number of traveling cycles of the mother tape 6 is recorded.

The reproduced signal S₄ is supplied to a positive pulse extracting circuit 75 and a negative pulse extracting circuit 76, the output pulses of these extracting circuits 75 and 76 being supplied to set terminal S and reset terminal R of the S-R flip-flop circuit 77. As appreciated from FIG. 19 (A) through 19 (B), the pattern of the output signal S₃ coincides with that of the recorded data (data of the number of traveling cycles of the mother tape) on the control track 52. Numeral 78 denotes a PLL (phase Locked Loop) and numeral 79 denotes a demodulation circuit for carrying out the special bi-phase mark demodulation. The output signal S₅ of the S-R flip-flop circuit 77 is directly transmitted to the demodulation circuit 79 and transmitted thereto via the PLL circuit 78. The PLL circuit 78 includes a phase comparator, low pass filter, voltage controlled oscillator, and a frequency divider. An output signal CK1 derived from a reference input portion of the phase comparator, i.e., frequency divider output is supplied to the clock terminal of the J-K flip-flop circuit 88 and negative logic inverter. The output signal CK1 has a frequency twice the frequency of the first portion of the signal S₅. This is appreciated from FIGS. 19 (C) and 19 (D).

The signal S₅ is supplied to the D terminal of a D type flip-flop circuit 80 and to one input terminal of an Exclusive-OR circuit 81. The other input terminal of the Exclusive-OR gate circuit 81 receives the output signal of the flip-flop circuit 80. The output signal S₆ of the Exclusive-OR gate circuit 81 is supplied to the D terminal of the D type flip-flop circuit 82. An output signal S₇ of he flip-flop circuit 82 indicates a demodulated output of the demodulator 79 in the preferred embodiment.

In addition, in the demodulator 79, the signal generated from the PLL circuit 78 (referred to hereinafter as a clock pulse CK1) is supplied to the inverter 83 and to the clock terminal of the J-K flip-flop circuit 88 of a synchronization reset type. The output signal of the inverter 83 is supplied to clock terminals of the flip-flop circuits 80 and 83 and the clock terminal of a binary counter 84 with a synchronization clear terminal for frequency division by half. Then, a signal of a high level "1" is supplied to the J and K terminals of the flip-flop circuit 88. An inverted signal S₈ of the flip-flop circuit 88 is supplied to a reset terminal R of the binary counter 84. An output signal S₇ of the flip-flop circuit 82 is fed back to the reset terminal R of the flip-flop circuit 88. Each reset terminal shown in FIG. 18 uses the negative logic system.

The output signal S₇ of the demodulator 79 is supplied to a data input terminal of the serial-to-parallel (S-P) converter 86. The output signal (hereinafter referred to as the clock pulse CK2) of the binary counter 84 in the demodulator 79 is supplied to the clock terminal of the serial-to-parallel converter 86. A 16-bit output data DH of the serial-to-parallel converter 86 is supplied to an address bus of a ROM (Read Only Memory) 87. The 8-bit data bus of the ROM 87 is used to read the output data D of 8 bits. The ROM 87 is used to perform an inverse of the conversion of the ROM 58 of FIG. 16.

An operation of the reproducing system shown in FIG. 18 when the record data to be recorded on the control track of the mother tape 6 indicates (—110111-01—) will be described with reference to FIG. 19.

A signal S₅ of FIG. 19 (C) can directly be deemed as the record data.

In this case, the clock pulse CK1 of FIG. 19 (C) is generated as shown in FIG. 19 (C). In the preferred embodiment, since two or more occurrences of "0" level continuous pulses are not generated in the signal S₅ (record data, refer to FIG. 17), the synchronization of the PLL circuit 78 is not disturbed and so-called self clocking becomes possible.

In addition, the output signal S₆ of the Exclusive-OR gate circuit 81 is such as shown in FIG. 19 (E). The inverted pulse of the clock pulse CK1 is changed as a signal S₇ (demodulation signal) such as shown in FIG. 19 (F) in which the inverted signal thereof is used as a trigger pulse for synchronizing the signal S₆. In other words, the signal S₇ is a signal by which the special bi-phase modulation is carried out over the signal S₆.

Furthermore, the clock pulse CK2 (refer to FIG. 19 (H)) derived by dividing the reversed pulse of the clock pulse CK1 by two can be used as a clock pulse for the serial-to-parallel converter 86. It is noted that the reversed output signal S₈ of the flip-flop circuit 88 is used to guarantee that the clock pulse CK2 rises at a boundary of the data of the signal S₇.

While the present invention has been disclosed in terms of the preferred embodiment in order to facilitate better understanding thereof, it should be appreciated that the invention can be embodied in various ways without departing from the principle thereof. Therefore, the invention should be understood to include all possible embodiments and modifications to shown embodiments which can be embodied without departing form the principle of the invention as set out in the appended claims.

For example, the remainder of a life of a mother tape may be recorded in place of the total number of traveling cycles thereof until now. Additionally, the present invention is applicable to a system which uses a tape repeatedly including a particular program such as a reproducing system which reproduced a commercial video on television broadcast or a duplicator for an audio tape.

What is claimed is:

1. A duplicator system comprising:
   first means for transporting a first recording medium on which an information signal is recorded through a first traveling path;
   second means for transporting a second recording medium through a second traveling path;

third means for transferring the information signal recorded on the first recording medium traveling through the first traveling path to the second recording medium traveling through the second traveling path;

fourth means for counting the number of traveling cycles of the first recording medium through the first traveling path to provide a signal indicative thereof; and fifth means for recording data indicative of the number of traveling cycles of the first recording medium counted by said fourth means on a preselected section of the first recording medium based on the signal from said fourth means.

2. A system as set forth in claim 1, wherein the information signal is recorded on a main section of the first recording medium, said fifth means recording the data indicative of the number of traveling cycles of the first recording medium on a section spaced from the main section by a preselected interval.

3. A system as set forth in claim 1, wherein the first traveling path defines a loop passing through said third means, said first means transporting the first recording medium through the loop endlessly.

4. A system as set forth in claim 1, wherein the first recording medium is magnetic mother tape, the second recording medium being blank magnetic tape, said third means transferring the information signal recorded on the mother tape to the blank magnetic tape.

5. A duplicator system comprising:

first means for transporting a first recording medium on which an information signal is recorded through a first traveling path;

second means for transporting a second recording medium through a second traveling path;

third means for transferring the information signal recorded on the first recording medium traveling through the first traveling path to the second recording medium traveling through the second traveling path;

fourth means for counting the number of traveling cycles of the first recording medium through the first traveling path to provide a signal indicative thereof;

fifth means for recording data indicative of the number of traveling cycles of the first recording medium counted by said fourth means on a preselected section of the first recording medium based on the signal from said fourth means; and sixth means for recording the data indicative of the number of traveling cycles of the first recording medium on a preselected section on the second recording medium.

6. A system as set forth in claim 5, wherein said sixth means is disposed on the second traveling path.

7. A system as set forth in claim 1, wherein data indicative of the number of traveling cycles of the first recording medium is prerecorded on the preselected section of the first recording medium before duplicating operation, said fourth means reading out the data from the first recording medium to add one to the read out data every traveling cycle thereof, said fifth means recording updated data indicative of the total number of traveling cycles on the preselected section of the first recording medium after duplicating operation.

8. A system as set forth in claim 1, wherein data indicative of the number of traveling cycles of the first recording medium is prerecorded on the preselected section of the first recording medium, said fourth means reading out the data from the first recording medium every traveling cycle thereof to add one to the read out data, said fifth means recording updated data on the preselected section of the first recording medium in every traveling cycle.

9. A system as set forth in claim 7, wherein said fourth means includes reproducing head, said fifth means including a recording head, the reproducing head reading out the data from the first recording medium, the recording head recording, the updated data on the first recording medium, the system further comprising a shifting mechanism which shifts the recording and reproducing heads onto the first recording medium only when reading data from and recording data on the first recording medium.

10. A system as set forth in claim 8, wherein said fourth means includes a reproducing head, said fifth means including a recording head, the reproducing head reading out the data from the first recording medium, the recording head recording the updated data on the first recording medium, the system further comprising a shifting mechanism which shifts the recording and reproducing heads onto the first recording medium only when reading data from and recording data on the first recording medium.

11. A system as set forth in claim 1, wherein said fourth means includes a first circuit for generating and transmitting the data indicative of the number of traveling cycles of the first recording medium which has a predetermined number of bits, a second circuit responsive to the data derived from the first circuit for converting the data into new data through a Read Only Memory which includes a table representing relations between the data from the first circuit and data of preselected bits in which consecutive occurrences of high and low level data components is limited to a predetermined value, and a third circuit for Bi-phase mark modulation in which a high level data component of the bits of the new data derived by the second circuit is reversed in level at the center of a bit cell period and a low level data component of the bits of the new data is not reversed in level at the center of a bit cell period as well as at a boundary relative to a subsequent bit, said fifth means including a circuit for recording said Bi-phase mark modulated data onto the first recording medium.

12. A system as set forth in claim 11, wherein the second circuit converts the data derived from the first circuit into the new data in such a way that data derived from the first circuit is converted into new data having 16 bits in which a low level or "0" data component does not occur consecutively more than twice.

13. A counting system comprising:

first means for transporting a strip recording medium on which an information signal is recorded toward signal processing means through a preselected traveling path;

second means for counting the number of traveling cycles of the strip recording medium through the traveling path to provide a signal indicative thereof; and third means for recording data indicative of the number of traveling cycles of the strip recording medium counted by said second means on a preselected section of the strip recording medium based on the signal from said second means.

14. A system as set forth in claim 13, wherein said signal processing means is provided with transferring means which transfers the information signal recorded on the strip recording medium to a second blank strip recording medium.

15. A system as set forth in claim 14, wherein data indicative of the number of traveling cycles of the strip recording medium is prerecorded on the preselected section of the strip recording medium, said second means reading out the data from the strip recording medium every traveling cycle thereof to add one to the read out data, said third means recording updated data on the preselected section of the strip recording medium in every traveling cycle.

16. A system as set forth in claim 14, wherein data indicative of the number of traveling cycles of the strip recording medium is prerecorded on the preselected section of the strip recording medium before duplicating operation, said second means reading out the data form the strip recording medium to add one to the read out data every traveling cycle thereof, said third means recording updated data indicative of the total number of traveling cycles on the preselected section of the strip recording medium after duplicating operation.

17. A system as set forth in claim 13, wherein the strip recording medium includes data indicative of the number of traveling cycles thereof previously executed which is recorded on the preselected section of the strip recording medium, said second means reading out said data from the strip recording medium every traveling cycle to add one to the read out data and providing the signal indicative thereof, said third means recording updated data indicative of the total number of traveling cycles on the preselected section of the strip recording medium every traveling cycle.

18. A system as set forth in claim 13, wherein the strip recording medium includes data indicative of the number of traveling cycles thereof previously executed recorded on the preselected section of the strip recording medium, said second means reading out said data form the strip recording medium when operation of the system is begun to add one to the read out data every traveling cycle of the strip recording medium and providing the signal indicative thereof, said third means recording updated data indicative of the total number of traveling cycles on the preselected section of the strip recording medium when the operation of the system is completed.

* * * * *